United States Patent
Neufeld

[19]

[11] Patent Number: 6,113,194
[45] Date of Patent: Sep. 5, 2000

[54] SIDE UNLOADING DUMP VEHICLE

[76] Inventor: Marvin Neufeld, Site 12, Box 2, R.R. #2, Leduc, Alberta, Canada, T9E 2X2

[21] Appl. No.: 09/274,437

[22] Filed: Mar. 22, 1999

[51] Int. Cl.[7] .................................. B60P 1/04; B60P 1/28; B61D 9/00; B65G 67/32
[52] U.S. Cl. ............................ 298/17.7; 298/17.6; 298/27
[58] Field of Search ......................... 298/13, 17.5, 17.6, 298/17.7, 18, 26, 27; 105/247

[56] References Cited

U.S. PATENT DOCUMENTS

| | | | |
|---|---|---|---|
| 1,897,175 | 2/1933 | Meyer | 298/26 |
| 2,284,661 | 6/1942 | Joy | 298/26 |
| 4,277,219 | 7/1981 | Rivers | 414/421 |
| 4,619,484 | 10/1986 | Maxey | 298/18 |
| 5,480,214 | 1/1996 | Rogers | 298/17.6 |
| 5,597,211 | 1/1997 | Golden | 298/17.6 |

FOREIGN PATENT DOCUMENTS 552 581   12/1956   Italy .................................... 105/247

*Primary Examiner*—D. Glenn Dayoan
*Assistant Examiner*—Scott A. Carpenter
*Attorney, Agent, or Firm*—Christensen O'Connor Johnson and Kindness PLLC

[57] ABSTRACT

A side unloading dump vehicle includes a support having ground engaging wheels. A container is provided having a first side, a second side, and a bottom pivotally attached along the first side. The container is movable relative to the support from a travel position to a dumping position. In the travel position, the container is set upon the bottom in a substantially central position on the support. In the dumping position, the container is raised and moved off-center toward the second side such that the bottom pivots downwardly to dump the contents of the container.

12 Claims, 6 Drawing Sheets

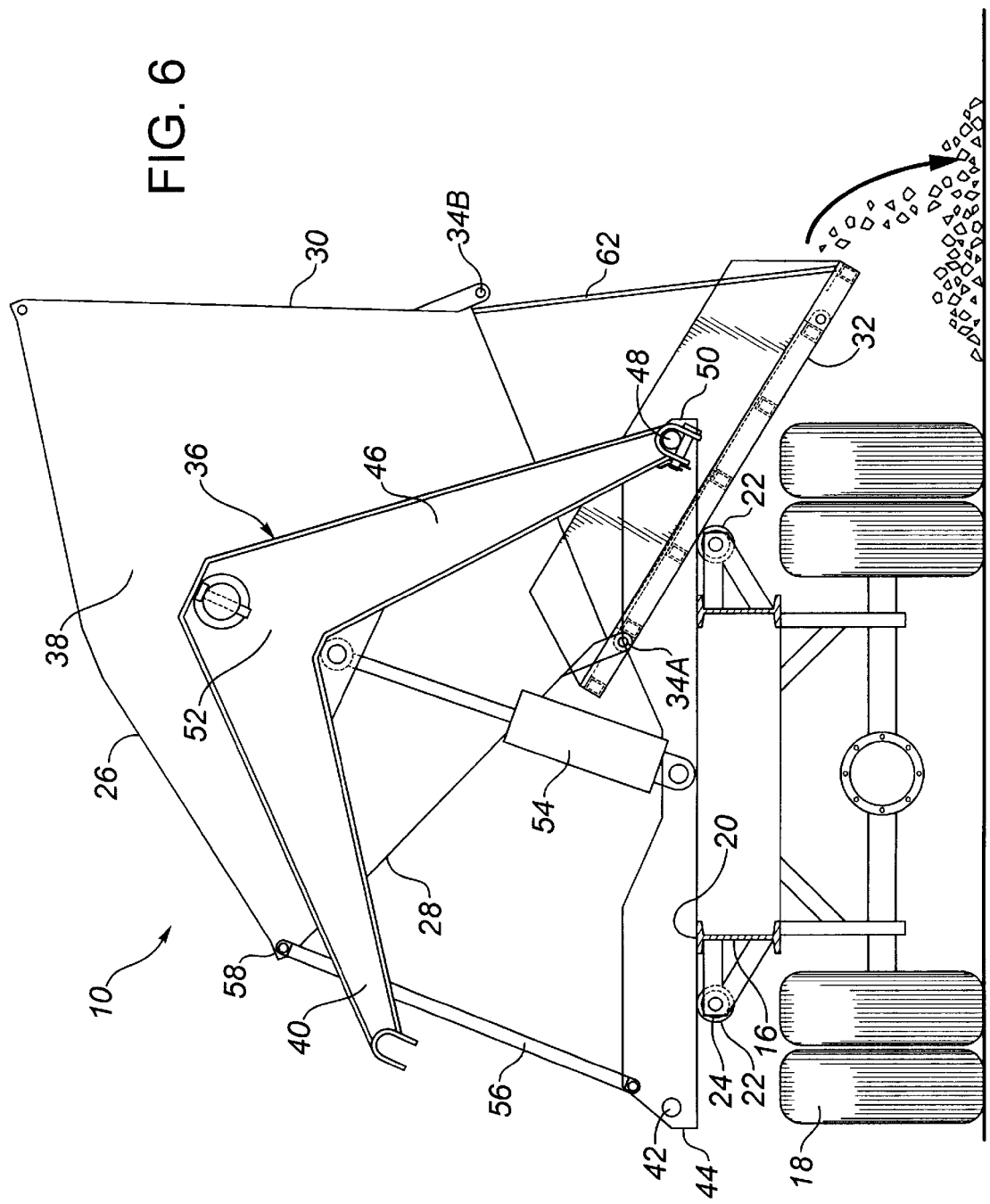

SIDE UNLOADING DUMP VEHICLE

FIELD OF THE INVENTION

The present invention relates to a side unloading dump vehicle.

BACKGROUND OF THE INVENTION

There are some applications for which side unloading dump vehicles are either desirable or essential. By way of example, it is not unusual for two trailers to be pulled one behind the other in what is known as a "Super B" trailer combination. In view of the proximity of the second trailer, the only manner in which the first trailer can dump is off to the side. By further way of example, in the construction industry problems are frequently incurred in dumping loads required for road widening. There is generally difficult or impossible due to space constraints for a rear unloading vehicle to positioned itself transversely across the roadway to dump in the desired location. A side unloading dump vehicle can take a number of forms; such as a dump truck, a trailer, or a rail car.

There are a number of side unloading dump vehicles that are disclosed in the patent literature, such as U.S. Pat. No. 5,480,214 which issued to Rogers in 1996 and U.S. Pat. No. 5,597,211 which issued to Golden in 1997. There patents both disclose side dumping mechanisms that tip a containment tub to one side in order to allow material to dump out of a top of the containment tub. This mechanism works in a satisfactory manner only so long as the material in the containment tub does not stick. Should the material stick with the containment tub in an angled and over centered dumping position, there is a danger that the vehicle will become top heavy and tip over.

SUMMARY OF THE INVENTION

What is required is an alternative configuration of side unloading dump vehicle.

According to the present invention there is provided a side unloading dump vehicle that includes a support having ground engaging wheels. A container is provided having a first side, a second side, and a bottom pivotally attached along the first side. Means is provided for moving the container relative to the support from a travel position to a dumping position. In the travel position, the container is set upon the bottom in a substantially central position on the support. In the dumping position, the container is raised and moved off-center toward the second side such that the bottom pivots downwardly to dump the contents of the container.

With the side unloading dump vehicle, as described above, the container is dumped from the bottom. This has proven to be a much more stable configuration than dumping from the top.

It is preferred that the means for moving the container relative to the support includes a pair of support arms; one at each end of the container. It is preferred that hydraulic actuators be used as means to move each of the support arms, thereby causing the container to be moved between the travel position and the dumping position. It is possible to configure the support arms so that with minor adjustments the side unloading dump vehicle can dump from either side. This is possible when the support arms have a first portion resting upon a first side of the support, a second portion resting upon a second side of the support and a central portion to which the container and the hydraulic actuator is secured. If "first side" is always considered to be the side adjacent the hinged side of the bottom, only the second side of the support arm is pivotally secured to the support. When the hinged side of the bottom is switched, the fixed pivoting side of the support arm is changed to correspond.

Although beneficial results may be obtained through the use of the side unloading dump vehicle, as defined above, it is easier to dump the material in the container, if the container is oriented at an angle. It is, therefore, preferred that means be provided for tipping the container at an angle when in the dumping position. The preferred means for doing so includes a linkage arm extending between the support and a top peripheral edge along the first side of the container.

Although beneficial results may be obtained through the use of the side unloading dump vehicle, as described above, there are means that can be provided to facilitate the movement of the bottom of the container. Even more beneficial results may be obtained when rollers are positioned on the support to facilitate a lateral sliding movement by the bottom of the container. It is also preferable that means be provided to limit the pivotal movement of the bottom of the container. The preferred means of doing that is to position chains that extends from a second side of the container to a remote end of the bottom.

BRIEF DESCRIPTION OF THE DRAWINGS

These and other features of the invention will become more apparent from the following description in which reference is made to the appended drawings, wherein:

FIG. 6 is a front elevation view of the side unloading dump vehicle illustrated in FIG. 1, with the container in the dumping position.

DETAILED DESCRIPTION OF THE PREFERRED EMBODIMENT

Figure 1:
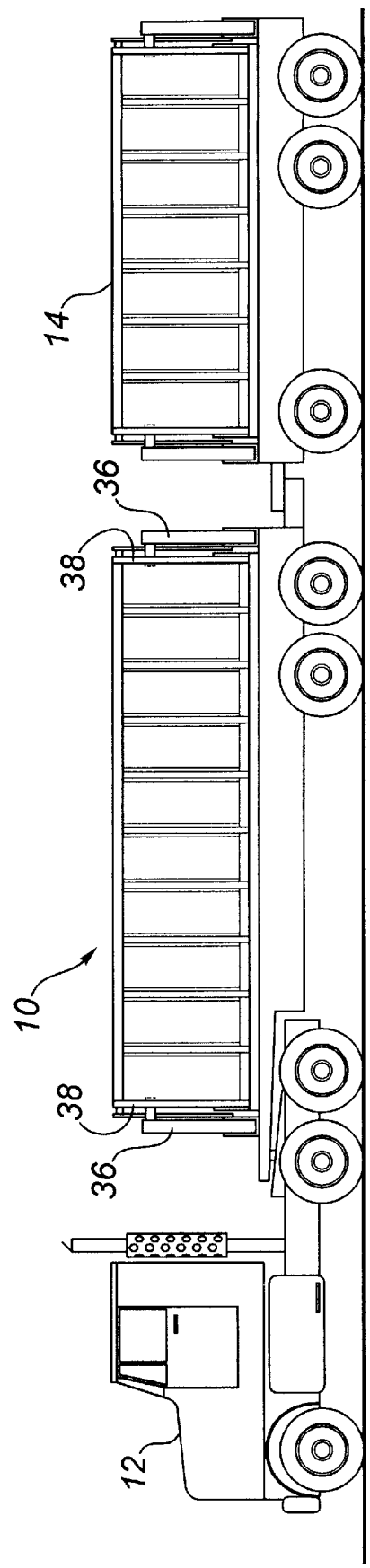
FIG. 1 is a side elevation view of a side unloading dump vehicle constructed in accordance with the teachings of the present invention in a tandem "Super B" configuration.

The preferred embodiment, a side unloading dump vehicle generally identified by reference numeral 10, will now be described with reference to FIGS. 1 through 6.

Figure 2:
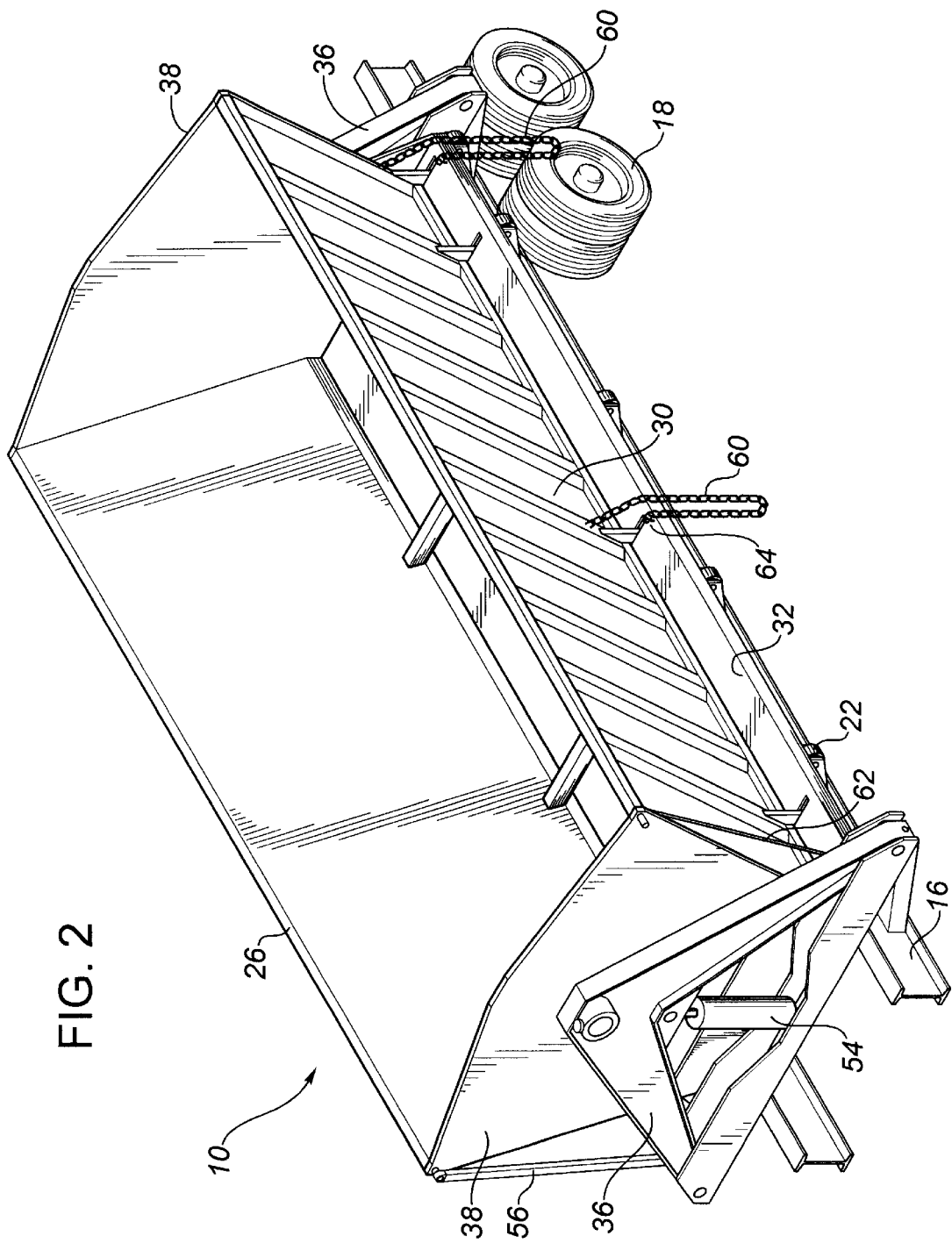
FIG. 2 is a perspective view of the side unloading dump vehicle illustrated in FIG. 1.
Figure 3:
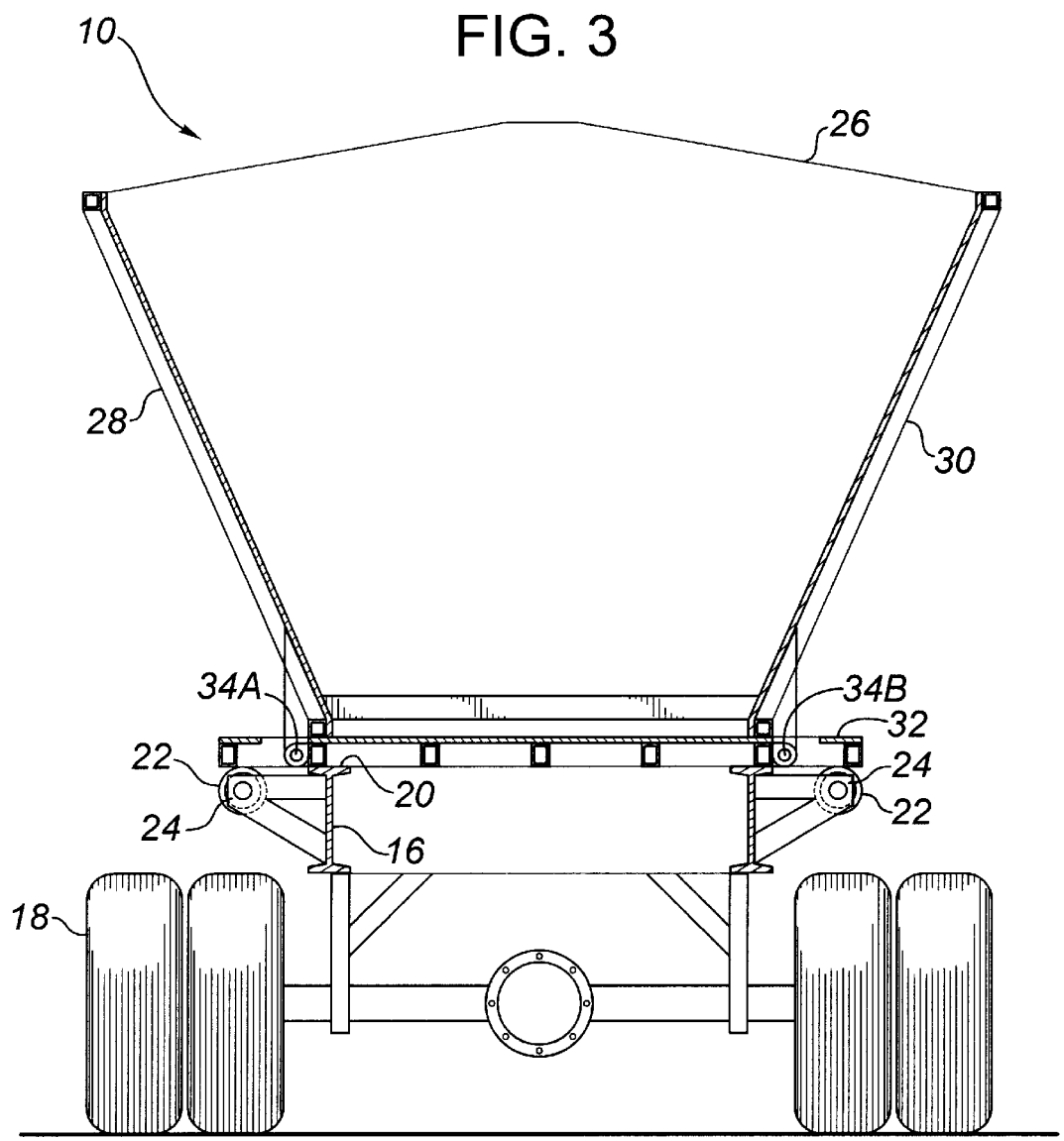
FIG. 3 is a front elevation view, in section, of the side unloading dump vehicle illustrated in FIG. 1.
Figure 4:
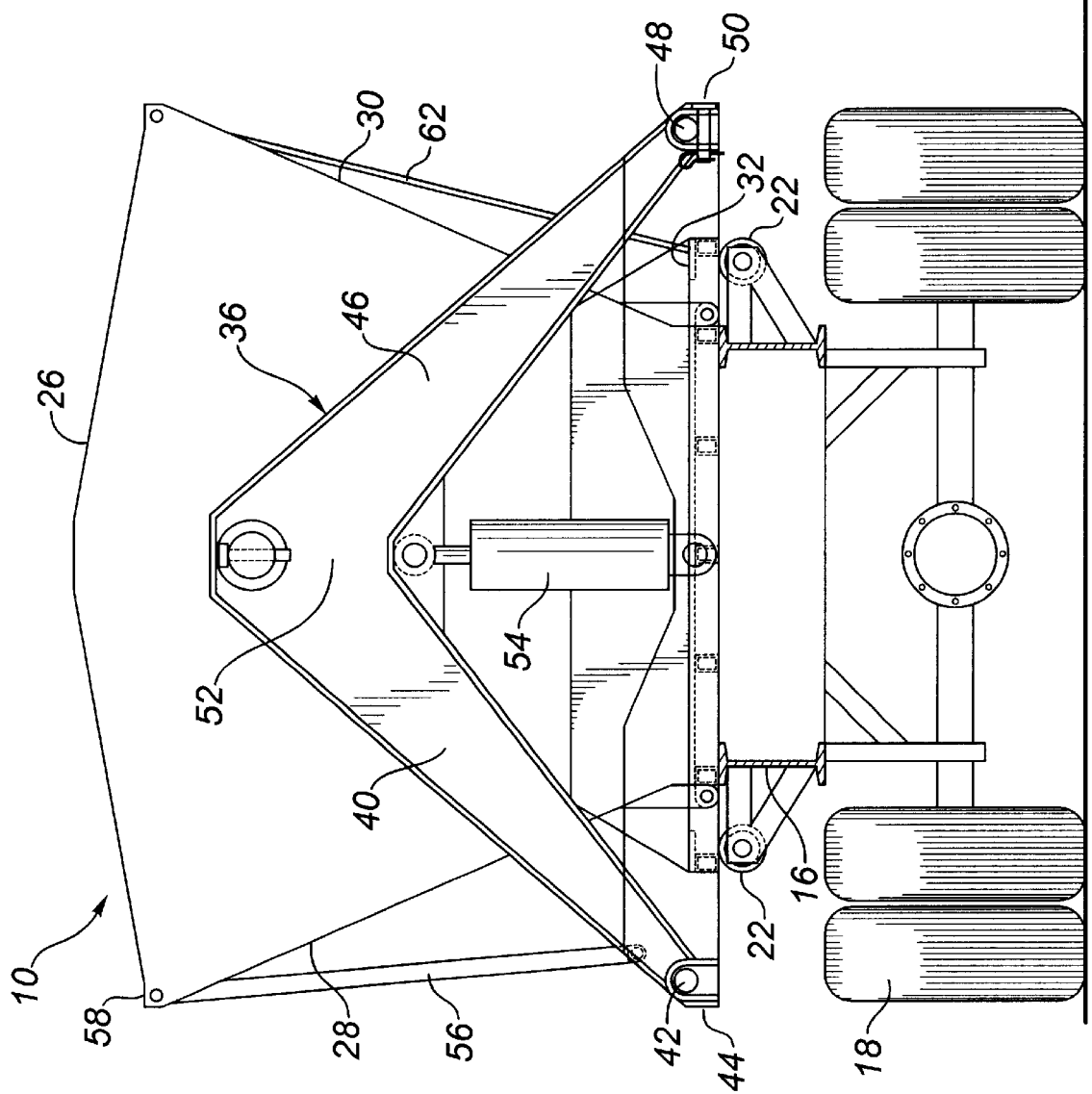
FIG. 4 is a front elevation view of the side unloading dump vehicle illustrated in FIG. 1, with the container in a travel position.
Figure 5:
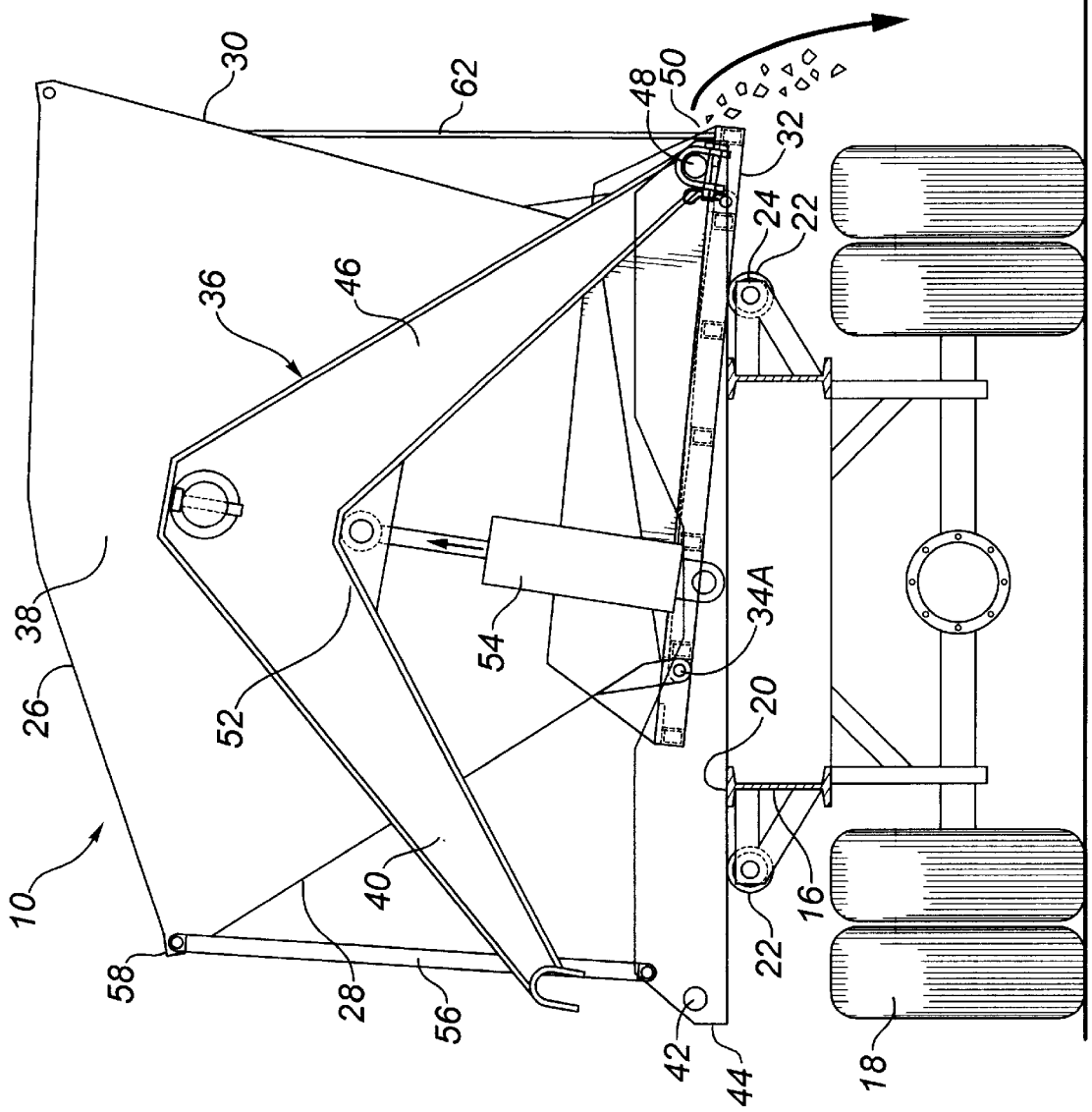
FIG. 5 is a front elevation view of the side unloading dump vehicle illustrated in FIG. 1, with the container in the process of moving from the travel position to the dumping position.

Referring to FIG. 1, there is illustrated side unloading dump vehicle 10 positioned in a "Super B" configuration with a truck 12 attached in a towing position and a second trailer 14 attached behind. It can be seen that in view of the positioning of second trailer 14, side dumping is the only manner of dumping side unloading dump vehicle 10 without the necessity of physically uncoupling second trailer 14. Referring to FIG. 2, side unloading dump vehicle 10 has a support frame 16 with ground engaging wheels 18. Referring to FIG. 3, it can been seen that support frame 16 provide a supporting surface 20 that includes rollers 22 along a peripheral edges 24. A container 26 is provided having a first side 28, a second side 30, and a bottom 32 pivotally attached at pivot point 34a along first side 28. There is an alternative pivot point 34b along second side 30. Alternative pivot point 34b is only used if it is desired to change the dumping of container 26 from one side of support frame 16 to the other. There are other adjustments which must be made at the same time, as will be hereinafter further described. Referring to FIGS. 1 and 2, support arms 36 are positioned at each end 38 of container 26. Support arms 36 are used to move container 26 relative to support frame 16 from a travel position illustrated in FIG. 4 to a dumping position illustrated in FIG. 6. Referring to FIG. 4, in the travel position container 26 is set upon it's bottom 32 in a substantially central position on support frame 16. Referring to FIG. 6, in the dumping position container 26 is raised and moved off-center toward second side 30. Referring to FIG. 5, bottom 32 slides laterally over rollers 22 on support frame 16 when moving from the travel position to the dumping position. Referring to FIG. 6, when container 26 reaches the dumping position, bottom 32 is no longer supported by rollers 22 on support frame 16 and pivots downwardly to dump the contents of container 26. Referring to FIG. 4, support arms 36 have a first portion 40 resting upon a pivot pin 42 at a first side 44 of support frame 16 and a second portion 46 resting upon a pivot pin 48 at a second side 50 of support frame 16. Support arm 36 also has a central portion 52 to which both container 26 and an hydraulic actuator 54 are secured. In the illustrated embodiment, only second portion 46 of support arm 36 is pivotally secured to pivot pin 48 at second side 50 of support frame 16. This is apparent from a review of FIGS. 5 and 6. If it was desirable to have side unloading dump vehicle 10 dump from the opposite side, first portion 40 would be secured and second portion 46 released. The movement of support arms 36 is effected by means of hydraulic actuators 54. The path of movement of hydraulic actuators can be seen by a comparison of FIGS. 4 through 6, as the angular position of support arms 36 is changed to move container 26 from the travel position to the dumping position. Referring to FIGS. 5 and 6, a linkage arm 56 extends between support frame 16 and a top peripheral edge 58 along first side 28 of container 26. Linkage arm 56 anchors top peripheral edge 58 of container 26 to support frame 16. As container 26 is raised and moved toward second side 30, this has the effect of tipping container 26 at an angle as it moves from the travel position to the dumping position. Referring to FIG. 2, chains 60 extend from second side 30 of container 26 and attached to a remote end 64 of bottom 32. The purpose of chains 60 is merely to limit the pivotal movement of bottom 32 of container 26. Chains 60 hang down and could potentially become caught in wheels 18. Referring to FIG. 6, instead of chains 60 near wheels 18, a guide rod 62 is slidably secured to second side 30 of container 26 and serves the same function as chains 60, that of limiting the pivotal movement of bottom 32 of container 26.

The use and operation of side unloading dump vehicle 10 will now be described with reference to FIGS. 1 through 6. Side unloading dump vehicle 10 is intended to be towed in a Super B configuration as illustrated in FIG. 1. Referring to FIG. 2, when side unloading dump vehicle 10 arrives at its intended destination, pins that are supported by chains 60 are removed to enable container to be moved from the travel position illustrated in FIG. 4 to the dumping position illustrated in FIG. 6. The movement is effected by hydraulic actuators 54. Hydraulic actuators 54 cause a pivotal movement of support arms 36 about pivot pin 48. Referring to FIG. 5, this pivotal movement of support arms 36 raises container 26 off supporting surface 20 and moves container 26 toward second side 30. As container 26 moves, bottom 32 slides over rollers 22. Referring to FIG. 6, as container 26 roves from the travel position to the dumping position, linkage arm 56 pulls upon top peripheral edge 58 along first side 28 of container 26 tipping container 26 at an angle. In the dumping position, bottom 32 is angled downwardly releasing the contents of container 26 by operation of gravity. Guide rod 62 serves to limit the pivotal movement of bottom 32 of container 26.

In order to have side unloading dump vehicle 10 dump from the opposite side the following changes must be made. Firstly, the pivotal attachment of bottom 32 is changed from pivot point 34a to pivot point 34b. Secondly, the pivot pin to which support arm 36 is secured is changed from pivot pin 48 to pivot pin 42. Thirdly, linkage arm 56 must be moved from first side 28 to second side 30. Fourthly, chains 60 and guide rod 62 must be moved from second side 30 to first side 28.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A side unloading dump vehicle, comprising:
   a support having ground engaging wheels;
   a container having a first side, a second side, and a bottom pivotally attached along the first side;
   a pair of support arms of a fixed length, one of the support arms being pivotally mounted to each end of the container, each of the support arms having a remote portion pivotally mounted to the support; and
   means for pivoting the support arms about the remote portion thereby moving the container relative to the support from a travel position to a dumping position, in the travel position the container is set upon the bottom in a substantially central position on the support, in the dumping position the container is raised and moved off-center toward the second side such that the bottom pivots downwardly to dump the contents of the container.

2. The side unloading dump vehicle as defined in claim 1, wherein the means to move each of the support arms being hydraulic actuators.

3. The side unloading dump vehicle as defined in claim 1, wherein means are provided for tipping the container at an angle when in the dumping position.

4. The side unloading dump vehicle as defined in claim 3, wherein the means for tipping the container is a linkage arm extending between the support and a top peripheral edge along the first side of the container.

5. The side unloading dump vehicle as defined in claim 1, wherein means are provided to limit the pivotal movement of the bottom of the container.

6. The side unloading dump vehicle as defined in claim 5, wherein the means to limit the pivotal movement of the bottom of the container includes chains that extends from a second side of the container to a remote end of the bottom.

7. The side unloading dump vehicle as defined in claim 1, wherein rollers are positioned on the support to facilitate a lateral sliding movement by the bottom of the container.

8. The side unloading dump vehicle as defined in claim 2, wherein the support arms have a first portion resting upon a first side of the support, a second portion resting upon a second side of the support and a central portion to which the hydraulic actuator is secured, only the second side of the support arm being pivotally secured to the support.

9. A side unloading dump vehicle, comprising:

a support having ground engaging wheels and a supporting surface that includes rollers along a peripheral edge;

a container having a first side, a second side, and a bottom pivotally attached along the first side; and a pair of support arms, one at each end of the container, for moving the container relative to the support from a travel position to a dumping position, in the travel position the container is set upon the bottom in a substantially central position on the support, in the dumping position the container is raised and moved off-center toward the second side, such that the bottom slides laterally over the rollers on the support and then pivots downwardly to dump the contents of the container;

means for moving the angular position of the support arms to move the container from the travel position to the dumping position;

a linkage arm extending between the support and a top peripheral edge along the first side of the container, whereby the container is tipped at an angle as it moves from the travel position to the dumping position.

10. The side unloading dump vehicle as defined in claim 9, wherein the means to move each of the support arms being hydraulic actuators.

11. The side unloading dump vehicle as defined in claim 9, wherein means are provided to limit the pivotal movement of the bottom of the container including chains that extends from a second side of the container to a remote end of the bottom.

12. The side unloading dump vehicle as defined in claim 9, wherein the support arms have a first portion resting upon a first side of the support, a second portion resting upon a second side of the support and a central portion to which the container and the hydraulic actuator is secured, only the second side of the support arm being pivotally secured to the support.

* * * * *

UNITED STATES PATENT AND TRADEMARK OFFICE
CERTIFICATE OF CORRECTION

PATENT NO. : 6,113,194
DATED : September 5, 2000
INVENTOR(S) : M. Neufeld

It is certified that error appears in the above-identified patent and that said Letters Patent is hereby corrected as shown below:

Title page,
Item [30], Foreign Application Priority Data: insert in appropriate order the following: -- [30]Foreign Application Priority Data Apr. 8, 1998 [CA] Canada 2234549 --

Signed and Sealed this

Fifth Day of March, 2002

Attest:

Attesting Officer

JAMES E. ROGAN
*Director of the United States Patent and Trademark Office*